United States Patent [19]

Itami et al.

[11] Patent Number: 5,684,785
[45] Date of Patent: Nov. 4, 1997

[54] OPTICAL DISK AND METHOD OF PREVENTING FRAUDULENT USE OF OPTICAL DISK ROTATION SYNCHRONOUS CONTROL SYSTEM

[75] Inventors: Satoshi Itami; Kenichi Utsumi; Kazuo Nakashima; Kazunori Naito; Satoshi Komura, all of Kawasaki, Japan

[73] Assignee: Fujitsu Limited, Kawasaki, Japan

[21] Appl. No.: 551,577

[22] Filed: Nov. 1, 1995

Related U.S. Application Data

[63] Continuation of Ser. No. 216,815, Mar. 23, 1994, abandoned.

[30] Foreign Application Priority Data

Jun. 7, 1993 [JP] Japan .................................. 5-135748

[51] Int. Cl.$^6$ ..................................................... G11B 17/24
[52] U.S. Cl. ............................................. 369/275.2; 380/4
[58] Field of Search ..................................... 369/32, 84, 47, 369/48, 54, 56, 58, 57, 275.1, 275.2, 275.3, 14, 15, 124, 273; 360/60; 430/10; 380/3, 4, 5; 386/126, 94

[56] References Cited

U.S. PATENT DOCUMENTS

| | | | |
|---|---|---|---|
| 4,879,704 | 11/1989 | Takagi et al. | 369/14 |
| 4,975,898 | 12/1990 | Yoshida | 369/48 |
| 5,173,886 | 12/1992 | Satoh et al. | 369/275.2 |
| 5,233,576 | 8/1993 | Curtis et al. | 369/275.2 |
| 5,241,531 | 8/1993 | Ohno et al. | 369/275.2 |
| 5,247,494 | 9/1993 | Ohno et al. | 369/14 |
| 5,265,082 | 11/1993 | Gniewek et al. | 369/53 |
| 5,265,230 | 11/1993 | Saldanha et al. | 369/275.2 |
| 5,283,779 | 2/1994 | Otsuki | 369/275.2 |
| 5,321,673 | 6/1994 | Okazaki | 369/275.2 |
| 5,418,852 | 5/1995 | Itami et al. | 380/4 |
| 5,570,339 | 10/1996 | Nagano | 369/275.3 |
| 5,608,717 | 3/1997 | Ito et al. | 369/275.3 |

*Primary Examiner*—Tan Dinh
*Attorney, Agent, or Firm*—Greer, Burns & Crain, Ltd.

[57] ABSTRACT

A method of preventing a fraudulent use of an optical disk having a read-write region and a read-only region, comprising the steps of: writing data for designating the boundary between the read-write region and the read-only region into a predetermined block of the optical disk; reading the data out of the predetermined block prior to the execution of the software recorded on an optical disk as an object of fraudulent use check; reading data out of a block which is assumed to be in the read-only region by reference to the data read out of the predetermined block, and writing the data read out of the block in the assumed read-only region into the same block; reading data out of a block which is assumed to be in the read-write region by reference to the data read out of the predetermined block, and writing the data read out of the block in the assumed read-write region into the same block; and judging that the optical disk as an object of fraudulent use check is not a fraudulent copy when the data writing operation is impossible in the block in the assumed read-only region but possible in the block in the assumed read-write region.

22 Claims, 12 Drawing Sheets

OPTICAL DISK AND METHOD OF PREVENTING FRAUDULENT USE OF OPTICAL DISK ROTATION SYNCHRONOUS CONTROL SYSTEM

RELATED APPLICATION

This is a continuation of application Ser. No. 08/216,815, filed on Mar. 23, 1994 and now abandoned.

BACKGROUND OF THE INVENTION

Field of the Invention

The present invention relates to an optical disk and a method of preventing a fraudulent use of an optical disk. More particularly, the present invention relates to an optical disk which can prevent a fraudulent copy of the data on the optical disk and a method of preventing a fraudulent use of such an optical disk.

An optical disk can record a great volume of data and facilitates a random access thereto. With the spread of an optical disk, there is a possibility of the data or a software such as a program recorded on an optical disk being fraudulently copied to another recording medium. In order to make an optical disk widespread while protecting the copyright on the data or a program, it is therefore necessary to devise some measure to prevent such a fraudulent copy.

According to ISO, an optical disk is provided with about 10,000 concentric or spiral tracks on a single side, and the whole tracks are divided into 25 fan-shaped sector (blocks).

FIG. 8 is an explanatory view of the structure of an optical disk based on the international standard (ISO). The abscissa represents a block number (0 to 24) and the ordinate a track number. The area of the tracks 3 to 9996 is an accessible region 1 to which the user can access by an ordinary method. The accessible region 1 is constituted by (1) a RAM region 2, (2) a ROM region 3 or (3) a partial ROM region which has the RAM region 2 on the inside and the ROM region 3 on the outside.

Defect management areas (DMAs) 4a, 4b having a disk definition sector (DDS) are provided on the three tracks on both sides of the accessible region 1, and inner and outer control track 5a, 5b and margin portions 6a, 6b are further provided on the inside and the outside of the defect management areas (DMAs), respectively.

In the defect management area (DMA), a disk definition sector (DDS) is provided, as described above, in which a medium type (presence or absence of a ROM), RAM region information, ROM region information, etc. are written. FIG. 9 is an explanatory view of the disk definition sector (DDS). A DDS identifier field $4_1$, a medium type filed $4_2$ (indicating the presence or absence of a ROM), a RAM region information field $4_3$, a ROM region information field $4_4$, a field $4_5$ for displaying the first address of a defect control area, etc. are provided in the disk definition sector (DDS). In the RAM region information field $4_3$ are written (1) the number $4_{31}$ of RAM groups when the RAM region is divided into a plurality of groups, (2) the number $4_{32}$ of data sectors (user blocks) in each RAM group, and (3) the number $4_{33}$ of spare sectors (spare blocks) each of which is used as a spare when there is a trouble in a user block. In the ROM region information field $4_4$ are written (1) the number $4_{41}$ of ROM groups when the ROM region is divided into a plurality of groups and (2) the number $4_{42}$ of data sectors (user blocks) in each ROM group.

In the first sector of the accessible region 1, a boot region 1a for storing a boot program and a section table region 1b are provided, as shown in FIG. 10. The accessible region 1 can be divided into a plurality of sections, and the information (section information) on each section is written in the section table region 1b. In FIG. 10, the accessible region 1 is divided into n sections (a first section $1c_1$ to an n-th section $1c_n$) and first section information to n-th section information are written into the section table region 1b. Each section information includes the first sector of the section, the last sector of the section, the number of sectors in the section, the format (e.g., DOS and UNIX) in the section, a write protect flag which indicates whether or not rewriting is inhibited in the section, etc.

Each section is provided with a file control area for storing file control information, and a file area for storing files, as shown in FIG. 11. In FIG. 11, the reference numeral 1c represents a section, 7a the file control area and 7b the file area. The file control area 7a stores a disk descriptor (or Bios Parameter Block (BPB) information) 7a-1, duplicated first and second file allocation tables (FATs) 7a-2, 7a-3, and a directory 7a-4 for indicating the first cluster number of each file. The disk descriptor 7a-1 describes the parameters of the volume structure of a disk, and includes a sector size SS (number of bytes per sector), the number SC of sectors (blocks) per cluster, the number FN (=2) of FATs, the number RDE of entries of root directory, the number TS of whole sectors, the number SF of sectors per FAT, the number SPT of sectors per track, etc.

Each of the FATs 7a-2, 7a-3 is composed of a format identifier (FI) 8a and an FAT entry portion 8b. The FAT entry portion 8b has the same number of FAT entries as the number of clusters in the section which take values of 0000, 0002 to MAX, FFF7 and FFFF. The value 0000 indicates that the cluster is unused. The values 0002 to MAX indicate that the clusters are in use, and designate the next storage location. The value FFF7 indicates that there is a defect in the sectors which constitute the cluster, and the value FFFF indicates that it is the last cluster of the file.

Each directory entry (32 bytes) includes a file name field, a file name extension field, an attribute field, a reserved field, a changed file time field, a changed file date field, a first cluster number field and a file size field.

If an optical disk having the above-described structure does not have software and hardware means for inhibiting copying, it cannot avert a fraudulent copy, which infringes the copyright and obstructs the spread of an optical disk: For example, 3.5-inch optical disks include optical disks especially for reading (ROM disks), and optical disks partially for reading (partial ROM disks) as well as rewritable optical disks (RAM disks). These ROM disks and partial ROM disks contain data and software such as a program which are recorded as desired. Therefore, if no measure is taken to inhibit copying, the software recorded on a ROM disk or in the ROM region of a partial ROM disk may be fraudulently copied, thereby infringing the copyright.

If an optical disk has software and hardware means for inhibiting copying, these problems are solved, but it is required that the optical disk having such means must have a format which meets ISO. Therefore, methods of preventing a fraudulent copy while providing an optical disk with a format which meets ISO are conventionally proposed.

A first method is a method of checking whether or not an optical disk has a ROM region when the optical disk is mounted on a drive device, and judging that the disk which does have a ROM region is a fraudulent copy because a RAM disk is used for copying. Whether or not an optical disk has a ROM region is judged by reference to the disk definition sector (DDS) in the defect management area (DMA).

A second method is a method of checking a fraudulent copy by using the size (number of blocks) of the rewritable region (RAM region) of a genuine optical disk (not a fraudulent copy but an original disk). More specifically, when an optical disk is mounted on a drive device, the RAM size of the optical disk and that of the genuine optical disk are compared with each other, and if the sizes are not the same, the mounted optical disk is judged to be a fraudulent copy. The size of the RAM region is recognized by reference to the disk definition sector (DDS).

A third method is a method of writing any given data in the block of an optical disk which is allotted to a ROM region in a genuine optical disk, and judging that it is a fraudulent copy if the data is written.

However these methods have the following problems.

In the first method, if an optical disk which has a very small ROM region and the greater part of which is a rewritable region is prepared, and the whole blocks are copied in logical block, units a fraudulent copy cannot be checked.

In the second method, the RAM size (number of blocks Lb) of a genuine optical disk is registered in the software (check program) for checking a fraudulent copy. However, since the number of blocks Lb of the RAM region becomes a value particular to the software, it is impossible to operate the software on another optical disk which has a different RAM size (number of blocks in the rewritable region). FIG. 12 explains this problem. The reference numeral 10a represents a commercially available optical disk on which a software A including a check program for preventing a fraudulent copy in accordance with the second method is written. In this program, the number of blocks in the RAM region is L1. The reference numeral 10b represents a similar commercially available optical disk in which a software B including a check program for preventing a fraudulent copy in accordance with the second method is written. In this program, the number of blocks in the RAM region is L2. If a user purchases both of the optical disks 10a and 10b and copies the software B from the optical disk 10b onto the optical disk 10a so as to operate by only one optical disk 10a, since the RAM sizes are different between the optical disks 10a and 10b, the check program judges that the software B on the optical disk 10a is a fraudulent copy, so that it is impossible to execute the software B on the optical disk 10a. Therefore, the user must mount the optical disk 10a on a disk drive device in order to execute the software A and mount the optical disk 10b on the disk drive device in order to execute the software B. In other words, it is necessary to change the optical disk mounted on the optical disk drive device in accordance with the software being executed. It is troublesome. If a system having a plurality of optical disk driving devices is used, it is naturally possible to mount the optical disks 10a and 10b on different optical disk driving devices for operation, but in this case, the system is expensive.

In addition, in the second method, when the software is upgraded and the number of blocks in the rewritable region is changed, it is inconveniently necessary to change the check program.

The third method has a risk of damaging the necessary data when data is written on an optical disk for the purpose of checking a fraudulent use. In addition, when a fraudulent copy of a genuine optical disk is write-protected, it is impossible to judge whether or not this medium is a fraudulent copy.

SUMMARY OF THE INVENTION

Accordingly, it is an object of the present invention to eliminate the above-described problems in the related art and to provide an optical disk which can check a fraudulent copy and a method of preventing a fraudulent use of an optical disk.

It is another object of the present invention to provide an optical disk which can check a fraudulent copy even if a user prepares an optical disk which has a very small read-only region (ROM region) and the greater part of which is a rewritable region (RAM region) and copies whole blocks in units of logical blocks, and a method of preventing a fraudulent use of an optical disk even in such a case.

It is still another object of the present invention to provide a method of preventing a fraudulent copy of an optical disk which offers convenience by allowing the software written on another optical disk which has an RAM region of a different size to be copied thereon so as to operate by only one optical disk.

It is a further object of the present invention to provide a method of preventing a fraudulent use of an optical disk without the need for changing the check program even if the number of blocks in the RAM region is changed with the upgrade of the software.

It is a still further object of the present invention to provide a method of preventing a fraudulent use of an optical disk without destroying the data written on an optical disk medium as an object of fraudulent use check.

It is a still further object of the present invention to provide a method of preventing a fraudulent use of an optical disk which enables judgement as to whether or not an optical disk medium as an object of fraudulent use check is write-protected.

It is a still further object of the present invention to provide a method of preventing a fraudulent use of an optical disk even if an optical disk medium as an object of fraudulent use is divided into various logical sections.

To achieve these ends, in a first aspect of the present invention, there is provided an optical disk having a boundary data block for storing data indicative of the boundary between a read-write region and a read-only region.

In a second aspect of the present invention, there is provided an optical disk having a boundary data block for storing data indicative boundary between read-write region and a read-only region and an address data block for storing data indicative of the address of the boundary data block.

In a third aspect of the present invention, there is provided a method of preventing a fraudulent use of an optical disk having a plurality of rewritable blocks defining a read-write region, a plurality of read-only blocks defining a read-only region and a boundary data block for storing data indicative of the boundary between said read-write region and said read-only region, comprising the steps of: (a) reading the boundary from the boundary data block prior to the execution of the software recorded on an optical disk; (b) reading data from a block which is assumed to be in the read-only region by reference to the boundary data, and attempting to write the data read from the block in the assumed read-only region into the same block; (c) reading data from a block which is in the read-write region indicated by the boundary data and writing the data read from the block in the assumed read-write region into the same block; and (d) judging that said optical disk is not a fraudulent use when the data writing operation of the step (b) is impossible and the data writing operation of the step (c) is possible.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (a) Schematic explanation of the invention In FIG. 1, the reference numeral 11 represents an optical disk, 12 a read-write region (RAM region), 13 a read-only region (ROM region), 14 the boundary between the RAM region 12 and the ROM region 13, 15 a block (boundary data holding block) for storing data E which designates the boundary, and 16 a block for storing data F which designates the address of the boundary data holding block 15.

Figure 1:
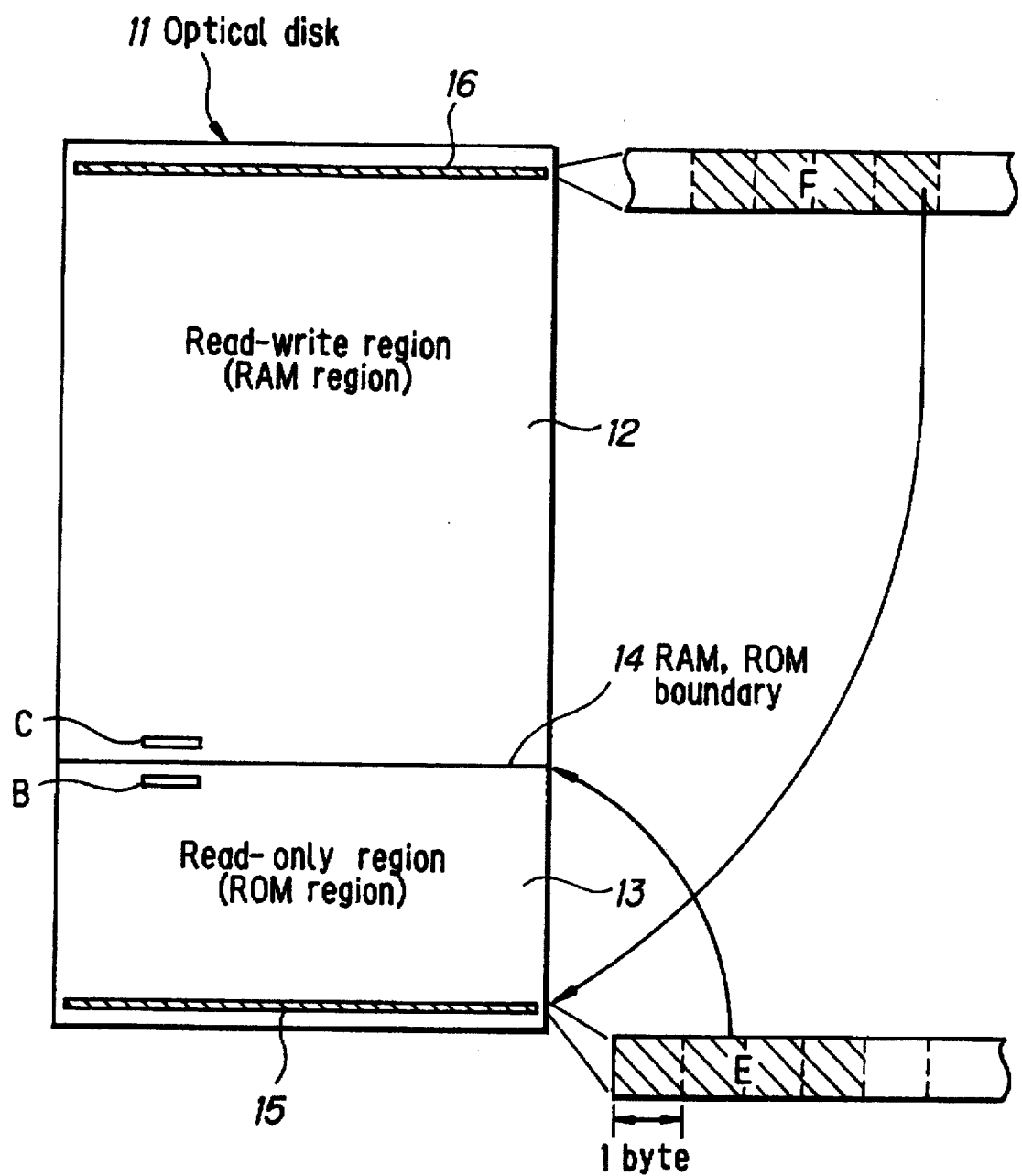
FIG. 1 is a schematic explanatory view of the principle of the present invention.

The data E for designating the boundary 14 between the RAM region and the ROM region is written in the predetermined block 15 of every genuine optical disk 11 (not a fraudulent copy but an original disk). When a disk is mounted on an optical disk drive device, or when the software is executed, the data E is read out of the block 15 of the mounted optical disk. Data is then read out of a block B which is assumed to be in the read-only region 13 by reference to the data E read out of the block 15. The data read out of the block B is written into the same block B. After data is read out of a block C which is assumed to be in the read-write region 12, the same data is written into the block C. If the writing operation is impossible in the block B which is indicated as the read-only region 13 but possible in the block C which is indicated as the read-write region 12, it is judged that the mounted optical disk is not a fraudulent copy. When the data writing operation is possible in the block B which is indicated as the read-only region 13, the mounted optical disk is judged to be a fraudulent copy. If the data writing operation is impossible both in the blocks B and C, the mounted optical disk is judged to be write-protected.

According to this method, even if a user prepares an optical disk which has a very small read-only region (ROM region) and the greater part of which is a rewritable region (RAM region) and copies the whole blocks in units of logical blocks, it is possible to check for fraudulent copying when the optical disk is used. It is also possible to copy the software written on another optical disk having an RAM region of a different size onto an optical disk of the present invention so as to operate with only one optical disk drive. Thus, the method offers convenience without raising the cost of the system. It is not necessary to change the check program even if the number of blocks in the RAM region is changed with the upgrade of the software. In addition, since the data read out of an optical disk medium, as an object of fraudulent use check, is written, the data written on the optical disk medium is not destroyed.

It is also possible to judge whether or not an optical disk medium that is an object of fraudulent use check is write-protected. In addition, it is possible to warn the user against the write protection so as to continue the check of a fraudulent use or execute other necessary processing.

Furthermore, if data F for designating the address of the block 15 in which the data E for designating the boundary 14 is written is contained in at least one block (address data holding block) 16 on the optical disk and the block 15 is searched for by reference to the data F, the process for obtaining the boundary data E becomes complicated, thereby preventing a fraudulent copy more effectively. If the data F is written in the first block of each logical section on the optical disk 11, it is possible to group the optical disk 11 into various logical sections so as to use them separately from each other.

If the data E for designating the boundary is written in a block in the read-only region 13, it is possible to record the data E on the optical disk 11 by stamping it together with the other data in the ROM region 13, thereby obviating the step of writing the data E at the time of shipping, reducing the number of steps for the production of the optical disk 11 and, hence, providing the optical disk 11 at a low cost. Furthermore, it is possible to avoid a risk of the data E being destroyed by accident after shipping.

(b) Embodiments of the present invention (b-1) Whole structure

Figure 2:
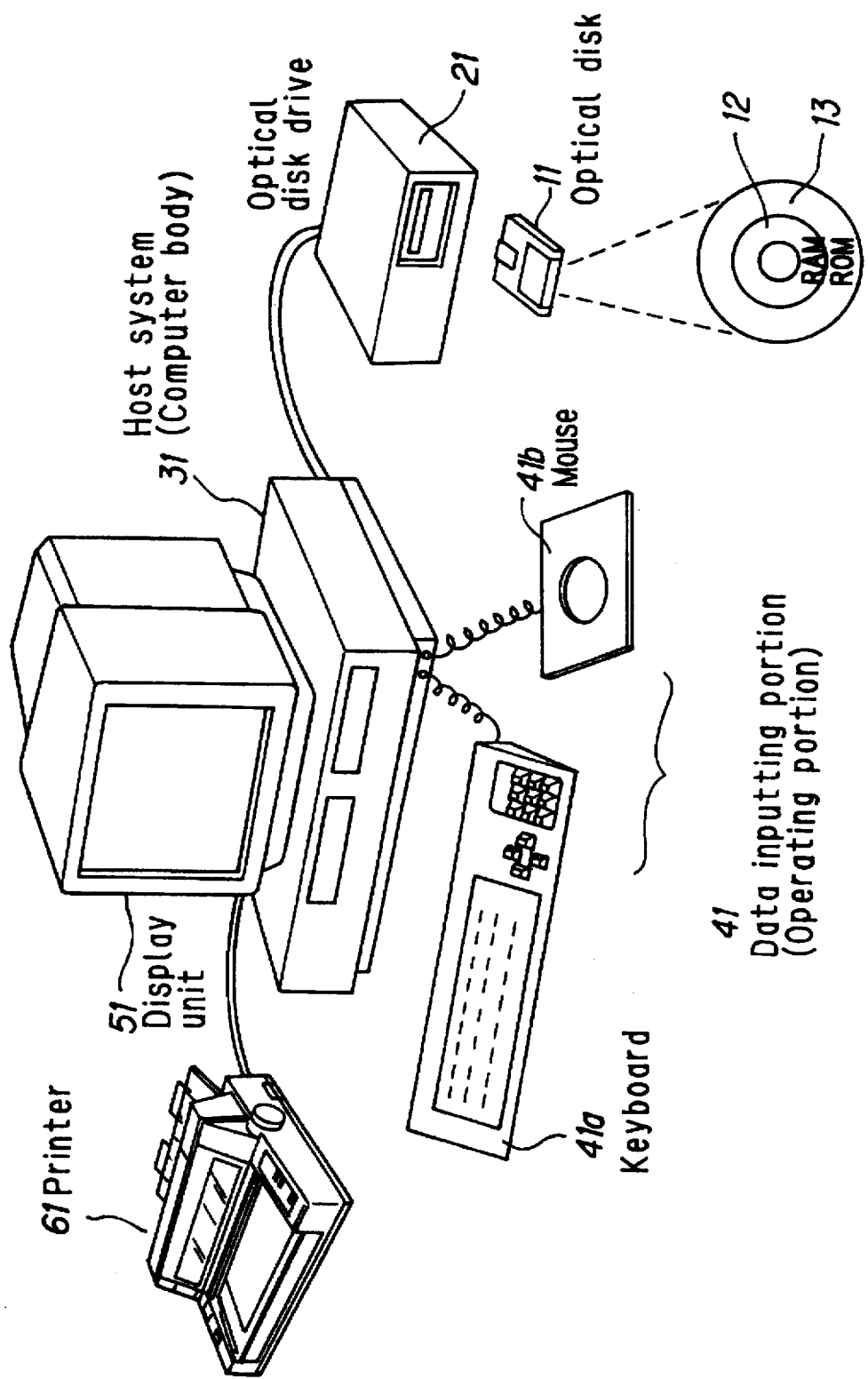
FIG. 2 shows the structure of a system to which the present invention is adaptable.

FIG. 2 is an external view of a system to which the present invention is adaptable. In FIG. 2, the reference numeral 11 represents an optical disk, 21 an optical disk drive, 31 a host system (computer body), and 41 a data inputting portion (operating portion). The system is also provided with a keyboard 41a and a mouse 41b. The reference numeral 51 represents a display unit such as a CRT and a liquid crystal display, and 61 a printer. The optical disk 11 has a RAM region 12 and a ROM region 13.

Figure 3:
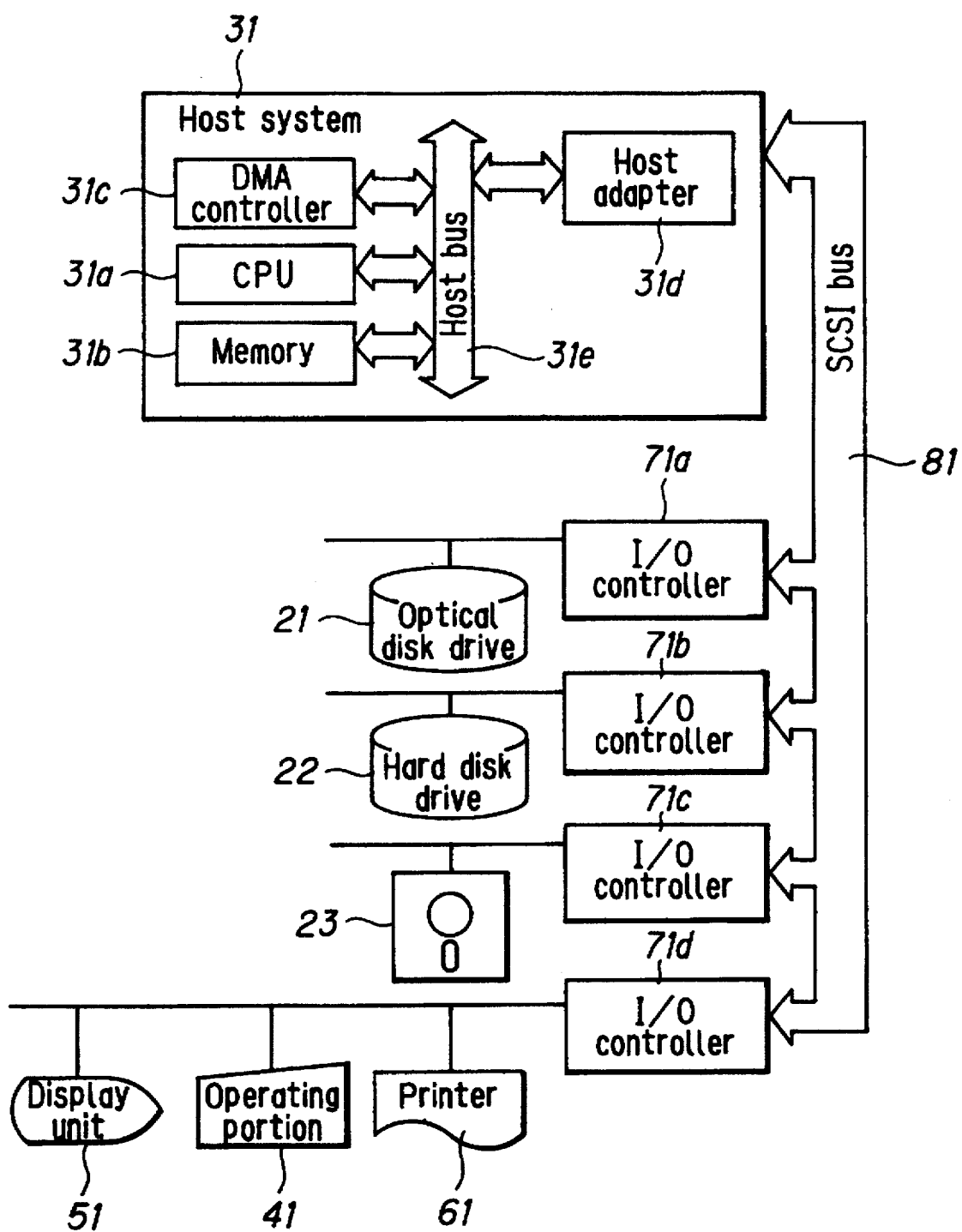
FIG. 3 shows the electric structure of a system to which the present invention is adaptable.

FIG. 3 shows the electric structure of the system. The same reference numerals are provided for the elements which are the same as those in FIG. 2. The reference numeral 21 denotes an optical disk drive, 22 a hard disk drive, 23 a floppy disk drive, 31 a host system, 41 an operating portion, 51 a display unit, 61 a printer, 71a to 71d I/O controllers, 81 a SCSI bus to which not more than eight I/O controllers can be connected. The optical disk drive 21, the hard disk drive 22 and the floppy disk drive 23 are connected to the I/O controllers 71a to 71c, respectively. Although only one drive is connected to each I/O controller in FIG. 3, two or more drives can be connected thereto. In the host system 31, the reference numeral 31a represents a central processing unit, 31b a memory, 31c a DMA controller, and 31d a host adapter. Each of these elements is connected to a host bus 31e. The host system 31 and each of the I/O controllers 71a to 71d is connected by an interface SCSI, and each I/O controller and each drive is connected by, for example, an interface ESDI. In this system, the peripheral equipments are separated from the host bus 31e, and the SCSI bus 81 is provided separately from the host bus 31e. The I/O controllers 71a to 71c for the peripheral equipments are connected to the SCSI bus 81 so as to control the peripheral equipments by the respective I/O controllers, thereby lightening the load of the host bus 31e.

(b-2) Structure of an embodiment of optical disk

Figure 4:
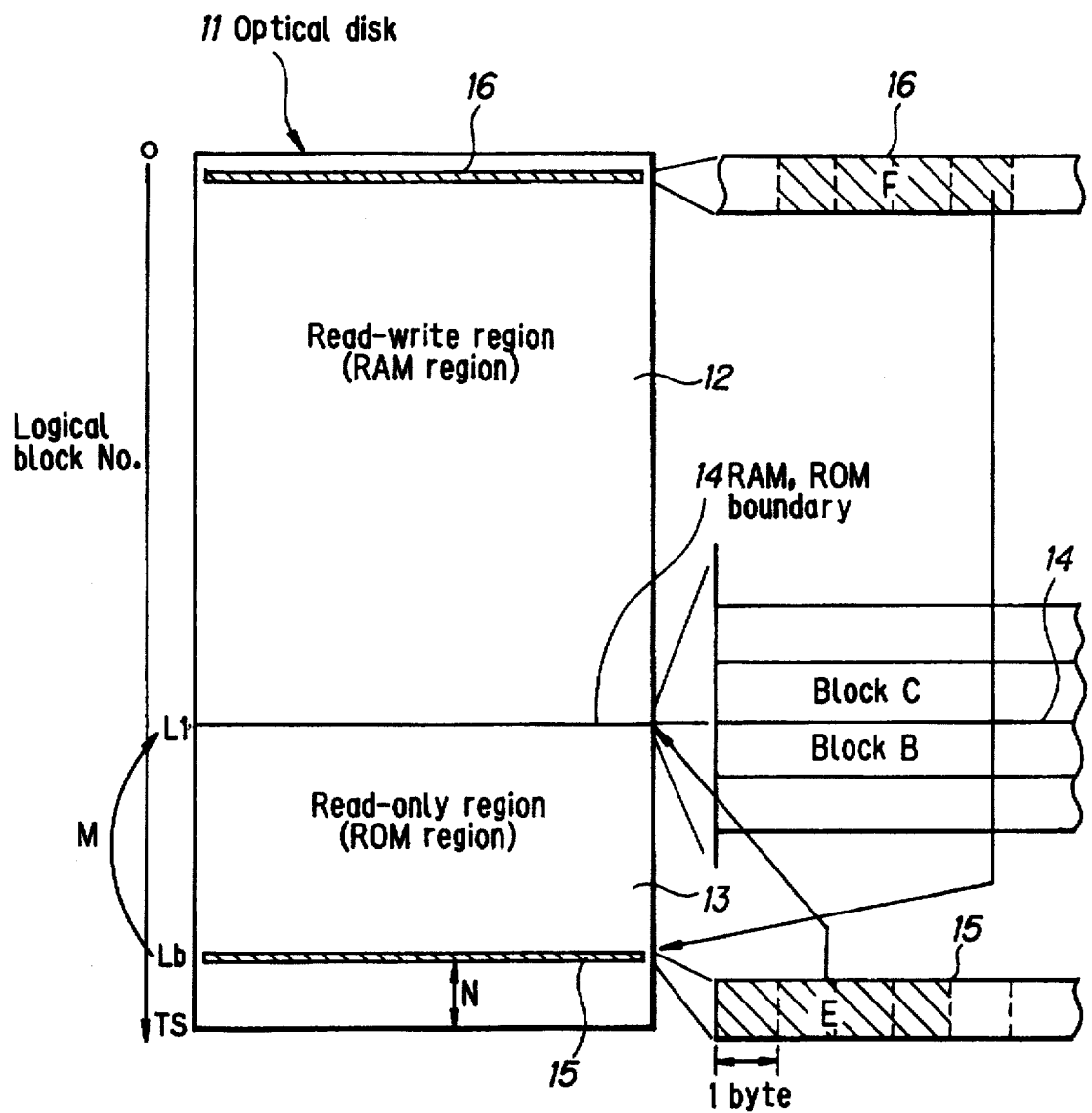
FIG. 4 shows the structure of an embodiment of an optical disk according to the present invention.

FIG. 4 shows the structure of an embodiment of a genuine optical disk according to the present invention. The ordinate represents a logical block number and the abscissa a byte (e.g., 512 bytes). The logical blocks are numbered consecutively starting with "0", "1" .... The reference numeral 11 represents an optical disk, 12 a read-write region (RAM region), 13 a read-only region (ROM region), 14 the boundary (ROM.RAM boundary) between the RAM region 12 and the ROM region 13, 15 a boundary data holding block for storing data E which designates the boundary 14 (the data E is written in the predetermined leading byte of the block), and 16 a address data holding block for storing data F which designates the address (the logical block number) of the block 15 in which the boundary data E is written.

Figure 11:
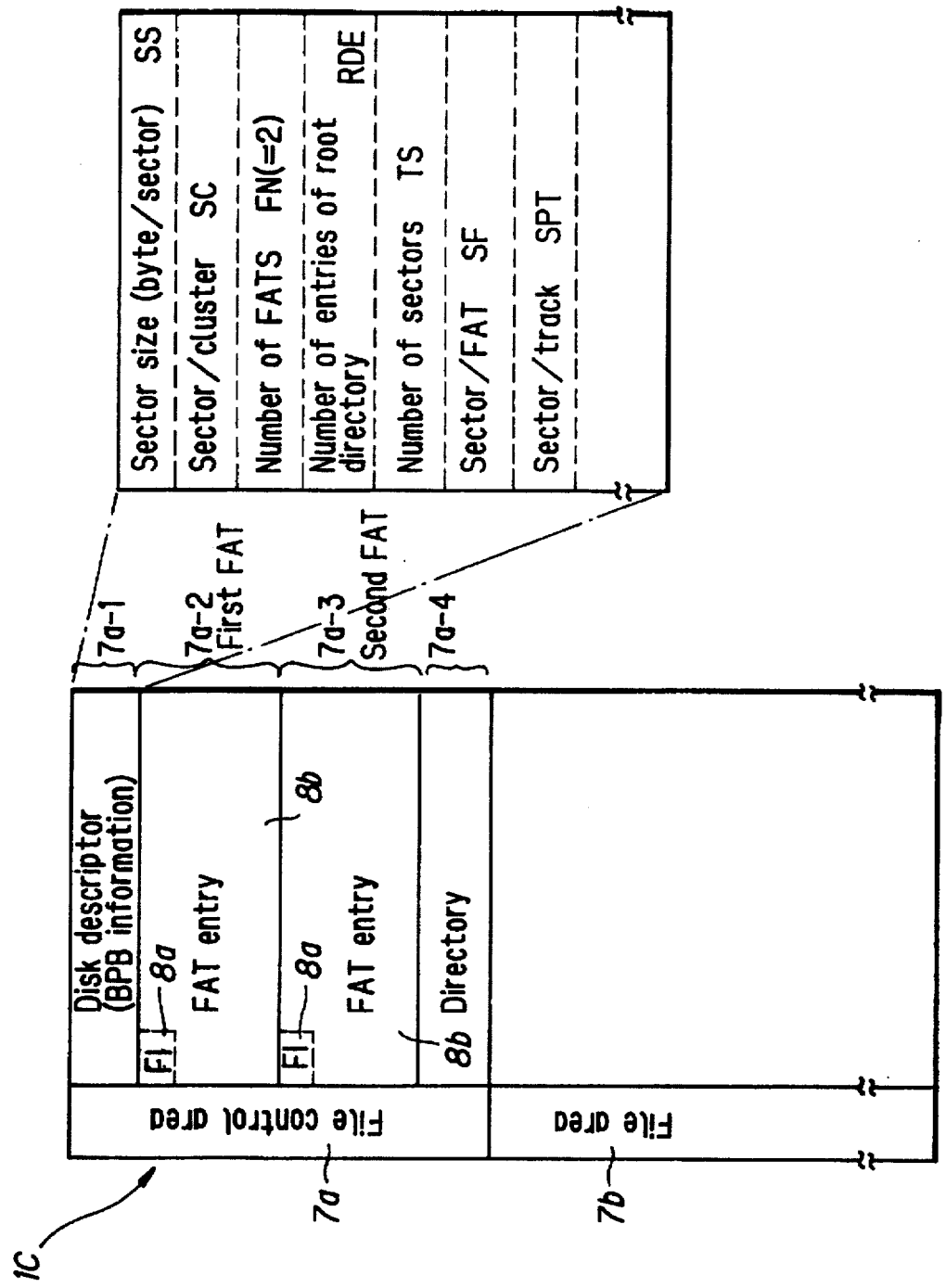
FIG. 11 is an explanatory view of the structure of a section.
Figure 12:
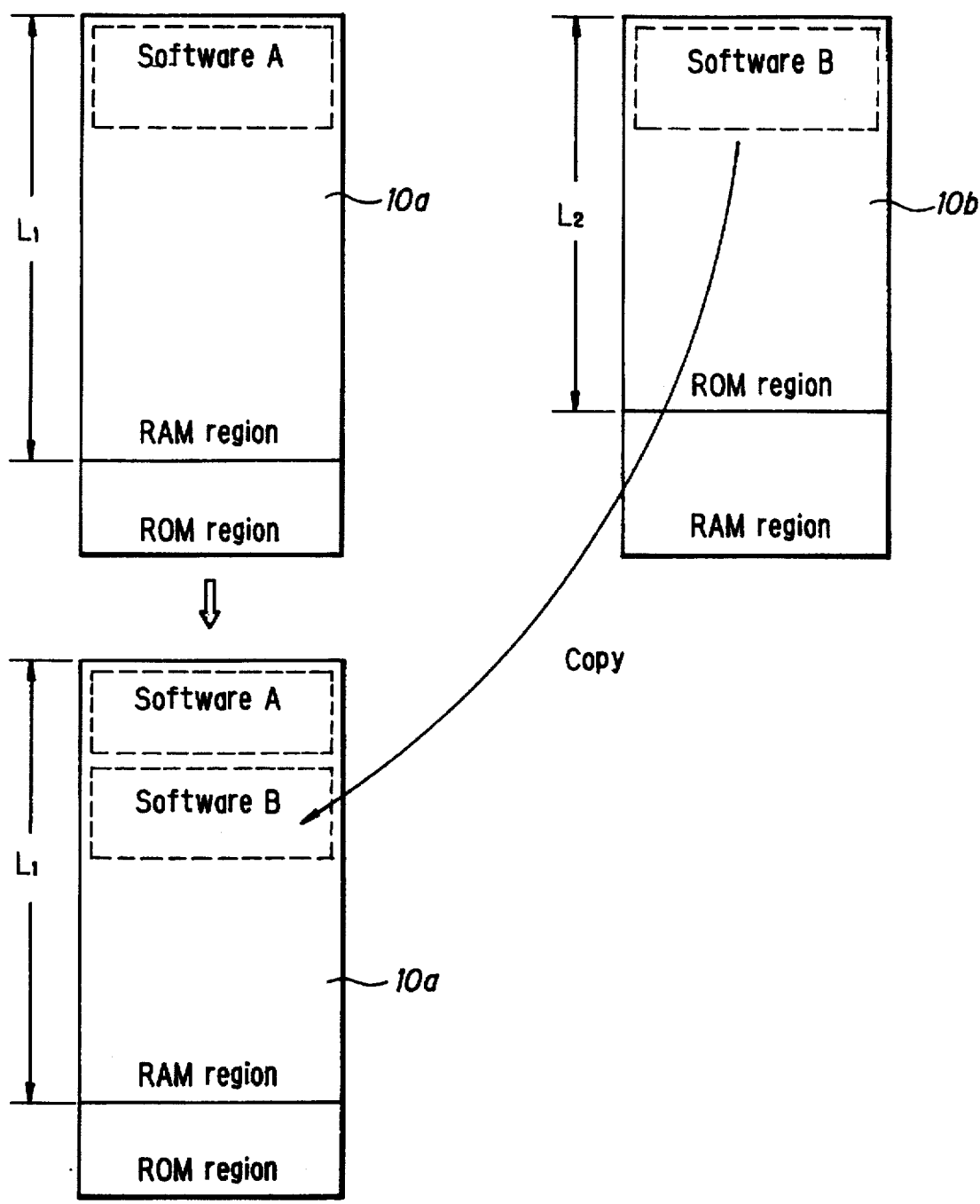
FIG. 12 is an explanatory view of the problems in the related art.

The address data holding block 16 in which the data F is written is, for example, the first block of a section which also stores BPB information (see FIG. 11). The block 15 (boundary data holding block) in which the boundary data E is written may be any block, but if the block 15 is N blocks distant from the last block of the accessible region, the data F specifies N. When the block 15 is the last block of the accessible region, the number TS of whole sectors which are contained in the BPB information on the block 16 can be regarded as the data F.

The boundary data E written in the boundary data holding block 15 is formed by coding M, which is the distance between the block 15 and the ROM.RAM boundary 14.

The boundary data holding block 15 is preferably provided in the ROM region 13. If the block 15 is provided in the ROM region 13, it is possible to record the data E on the optical disk 11 by stamping it together with the other data in the ROM region 13.

(b-3) Method of checking fraudulent copy

Figure 5:
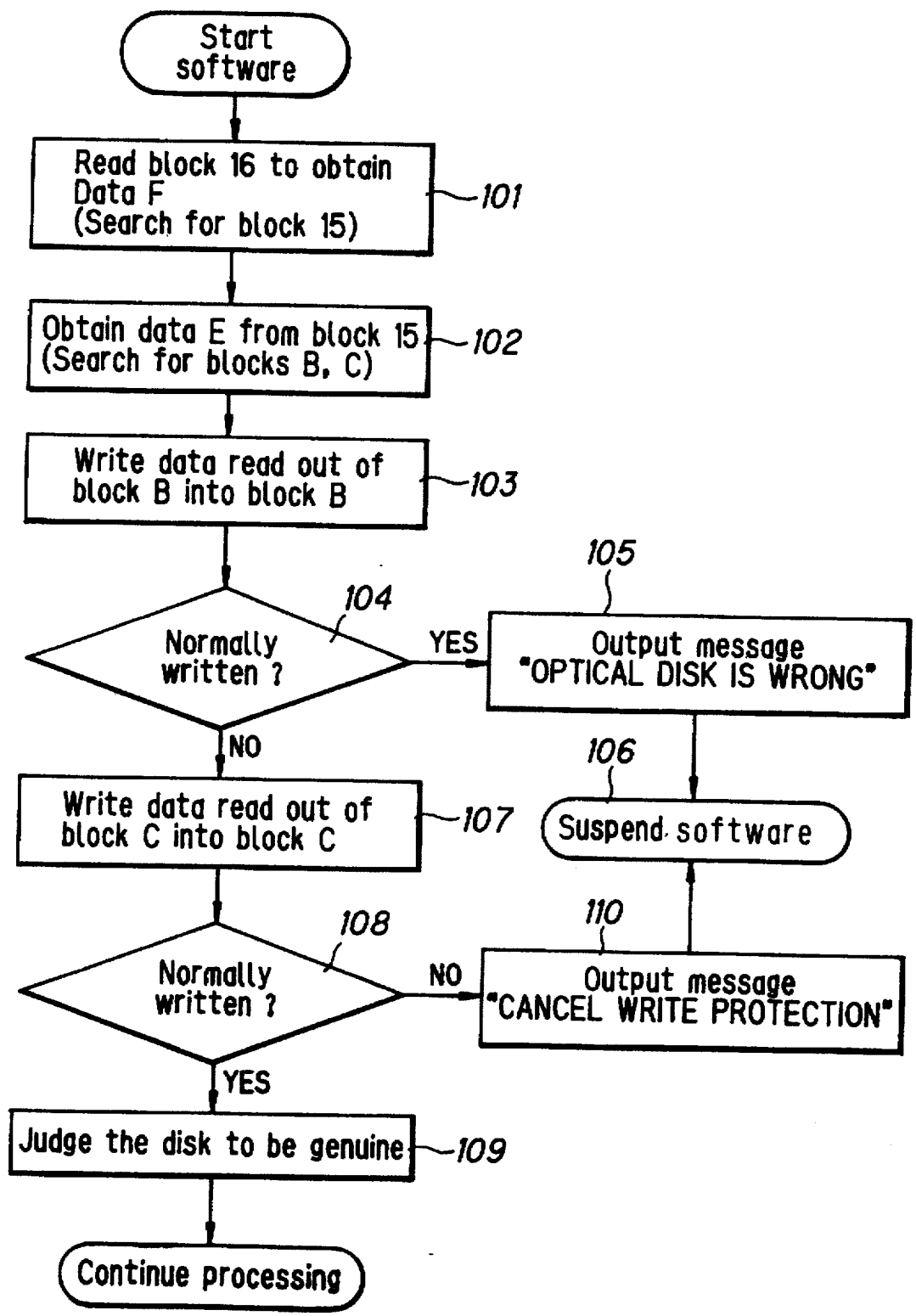
FIG. 5 is a flowchart of the process of checking a fraudulent copy.

FIG. 5 is a flowchart of the process of checking a fraudulent use of an optical disk having the structure shown in FIG. 4.

When an optical disk (whether this is a genuine optical disk or a fraudulent copy is not known) is mounted on the optical disk drive 21 and the power switch is turned on, the host system 31 executes the following fraudulent copy checking processings on the basis of the check program contained in the software. The software may be stored in the memory of the host system 31 in advance, or may be read out of the mounted optical disk after the power switch is turned on and transferred to the host system 31.

The host system 31 reads the address data holding block 16 of the mounted optical disk in accordance with the check program and obtains the data F from the predetermined byte (step 101). The address of the boundary data holding block 15 is searched for by using the data F. For example, if the block 15 is N blocks distant from the last block of the accessible region, since the data F specifies N, the number TS of whole blocks is obtained from the BPB information, and (TS−N) is decided as the logical block number Lb (Lb=TS−N) of the block 15.

Thereafter, the boundary data E is read out of the leading several bytes of the boundary data holding block 15 and decoded (step 102). If the content of the boundary data E is M, (Lb−M) is decided as the logical block number L1 (L1=Lb−M) of the boundary 14, and it is assumed that the region having a smaller logical block number than the logical block number L1 of the boundary 14 is the read-write region 12 and the region having a larger logical block number than the logical block number L1 of the boundary 14 is the read-only region 13.

The data is then read out of a block B having a larger logical number than the logical block number L1 of the boundary 14, and the same data is written into the same block B (step 103). By writing the read data, it is possible to prevent the destruction of data. The block B is preferably in the vicinity of the boundary 14.

Thereafter, whether or not the data is normally written in the block B is checked (step 104), and if the answer is yes, the mounted optical disk is judged to be a fraudulent copy because the ROM.RAM boundary is different from that of the genuine optical disk 11. That is, since the data is written in the block which should be in the ROM region if the mounted optical disk is the genuine optical disk 11, the mounted optical disk is judged to be a fraudulent copy. When the data is normally written in accordance with the command from the host system 31, the signal indicating that the command has been executed is issued from the optical disk drive 21 to the host system 31 through the interface SCSI.

If the mounted optical disk is judged to be a fraudulent copy, a message "THE OPTICAL DISK MEDIUM IS WRONG" is output to the display unit 51 (step 105), and the execution of the software is suspended (step 106).

On the other hand, when the data is not normally written, the data is read out of a block C which is assumed to be in the read-write region 12, and the read data is written into the same block C (step 107). The block C is preferably in the vicinity of the boundary 14.

Thereafter, whether or not the data is normally written in the block C is checked (step 108), and if the answer is yes, the mounted optical disk is judged to be the genuine optical disk 11, and the subsequent processings are continued. In other words, the mounted disk is judged to be the genuine optical disk 11 (not a fraudulent copy) only when (1) data cannot be written in a block which is assumed to be in the read-only region 13 and (2) data can be written in a block which is assumed to be in the read-write region 12.

When data cannot be normally written in either block, the mounted optical disk is judged to be write-protected. In this case, since it is impossible to judge whether the mounted optical disk is the genuine optical disk 11 or a fraudulent copy, a message "CANCEL WRITE PROTECTION" is output to the display unit 51 (step 110), and the execution of the software is suspended (step 106). After the write protection is cancelled, the software is restarted, and the above-described processing are repeated from step 101.

In this embodiment, the position of the boundary data holding block 15 is specified from the number N of blocks between the last block of the accessible region and the boundary data holding block 15 through the data F, but it is also possible to specify the address of the boundary data holding block 15 directly from the data F.

(c) Structure of another embodiment of optical disk

Figure 6:
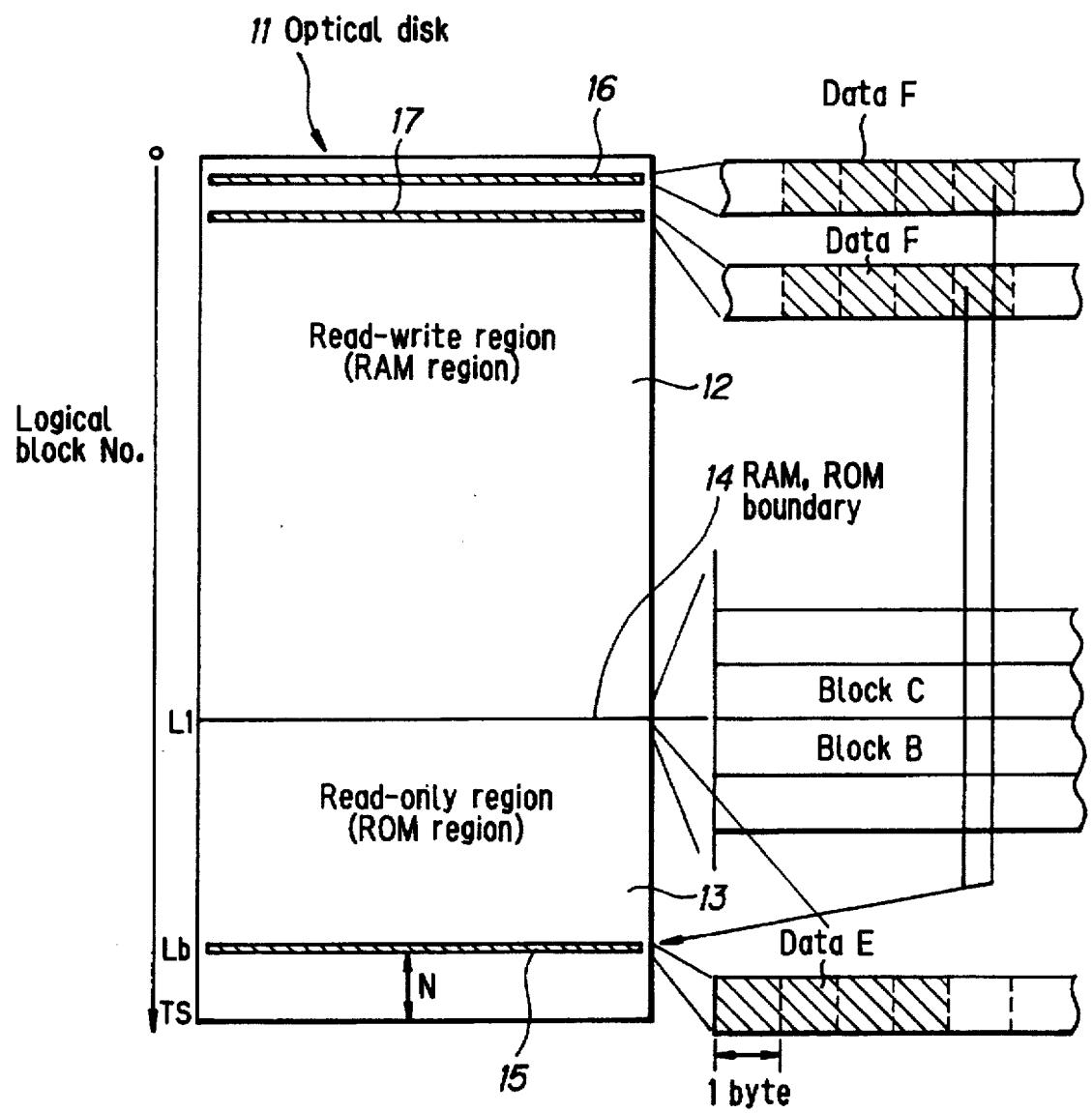
FIG. 6 shows the structure of another embodiment of an optical disk according to the present invention.

In the embodiment described in (b), the data F for designating the address of the boundary data holding block 15 is written in the entry (the first block 16) of one section. When there are respective entries in a plurality of sections, it is possible to write the data F in each entry block. FIG. 6 shows the structure of an embodiment of an optical disk which has a plurality of entries. The same reference numerals are provided for the elements which are the same as those in FIG. 4. The reference numeral 11 represents a genuine optical disk, 12 a read-write region (RAM region), 13 a read-only region (ROM region), 14 the boundary (ROM.RAM boundary) between the RAM region 12 and the ROM region 13, 15 a block (boundary data holding block) for storing data E which designates the boundary 14, and 16, 17 blocks for storing data F which designates the address of the boundary data holding block 15, each of them being the first block of a section. Since the data F which designates the address of the boundary data holding block 15 is written in each logical section on the optical disk medium in this way, it is possible to use the optical disk medium in various groups of logical sections.

(d) Example of usage

Figure 7:
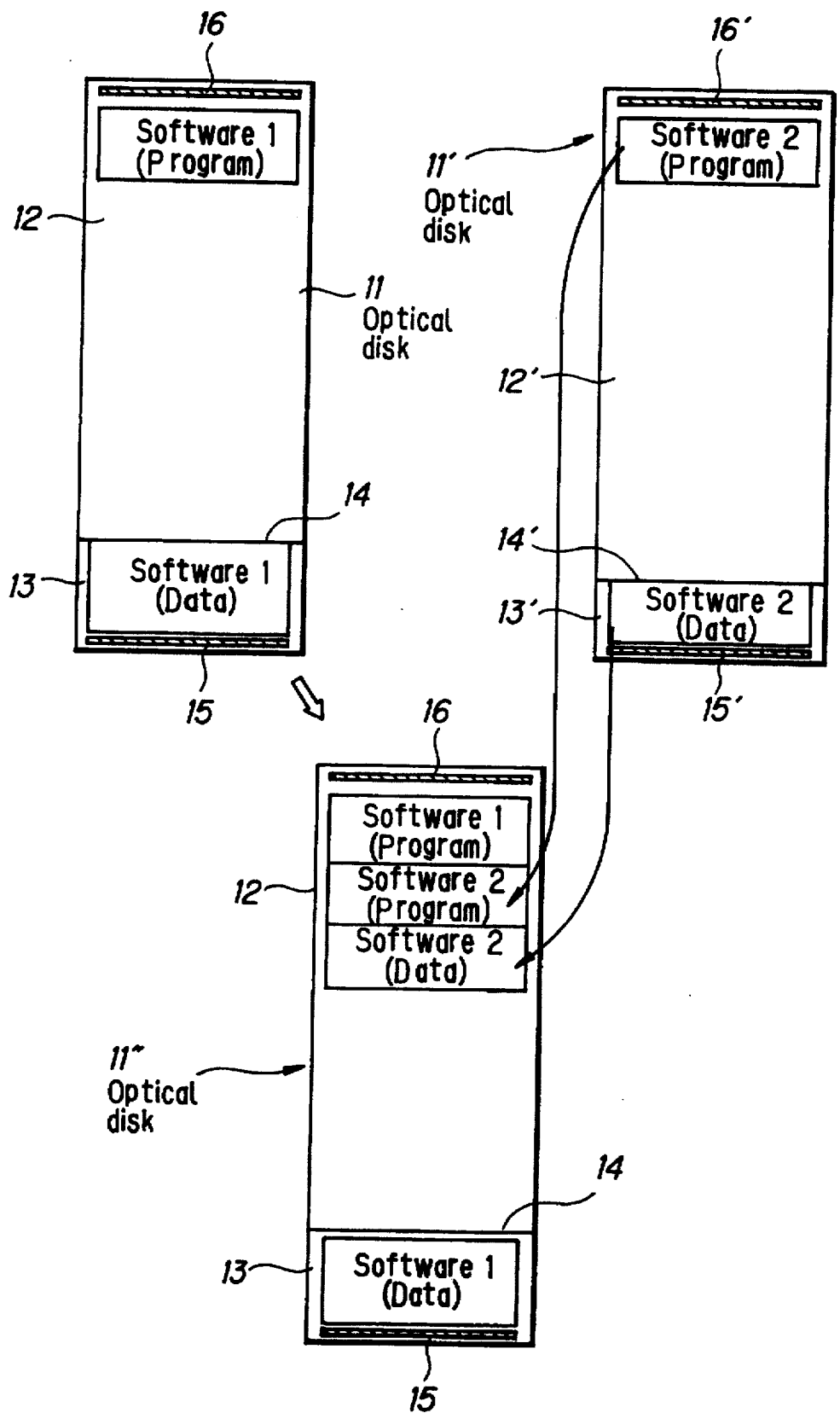
FIG. 7 is an explanatory view of an example of usage of optical disks according to the present invention.
Figure 8:
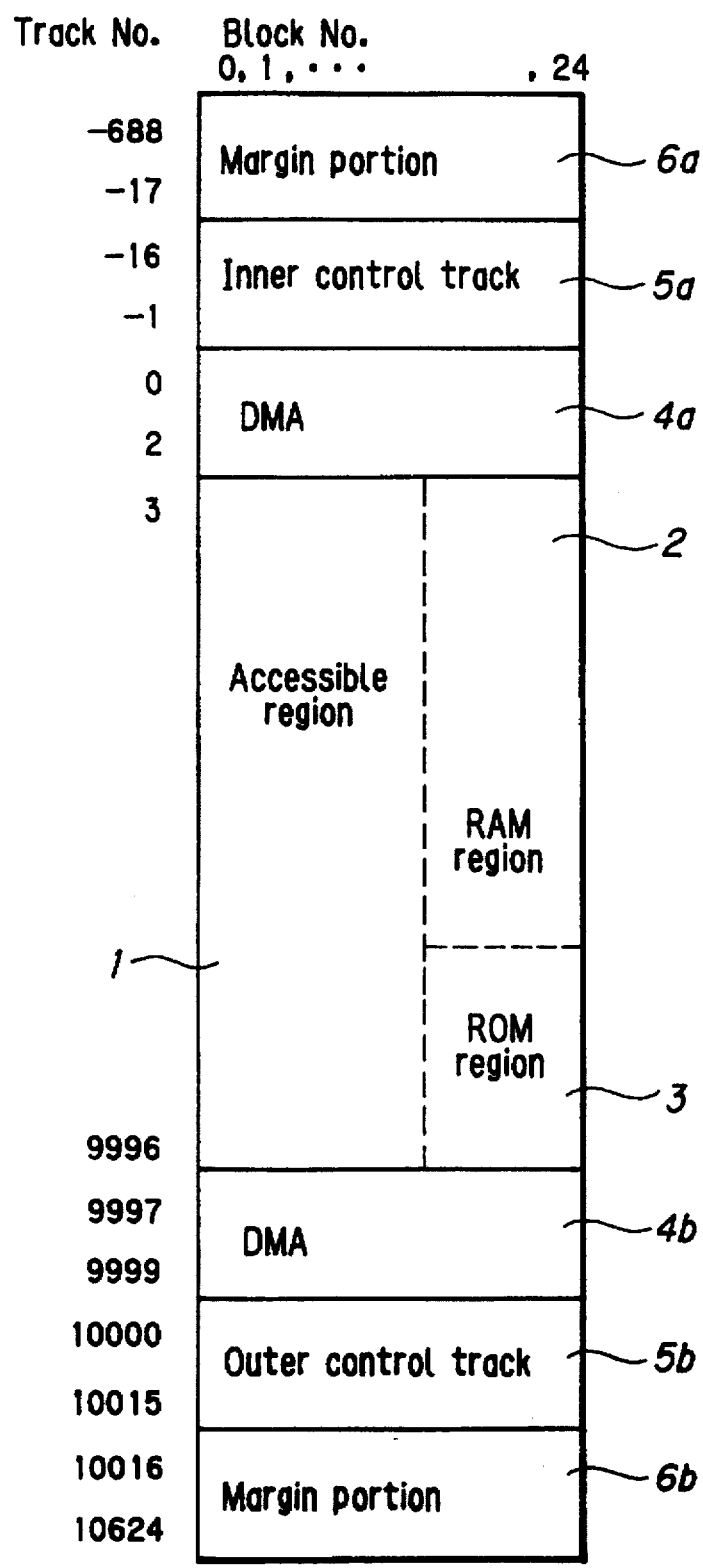
FIG. 8 is an explanatory view of the structure of an optical disk.
Figure 9:
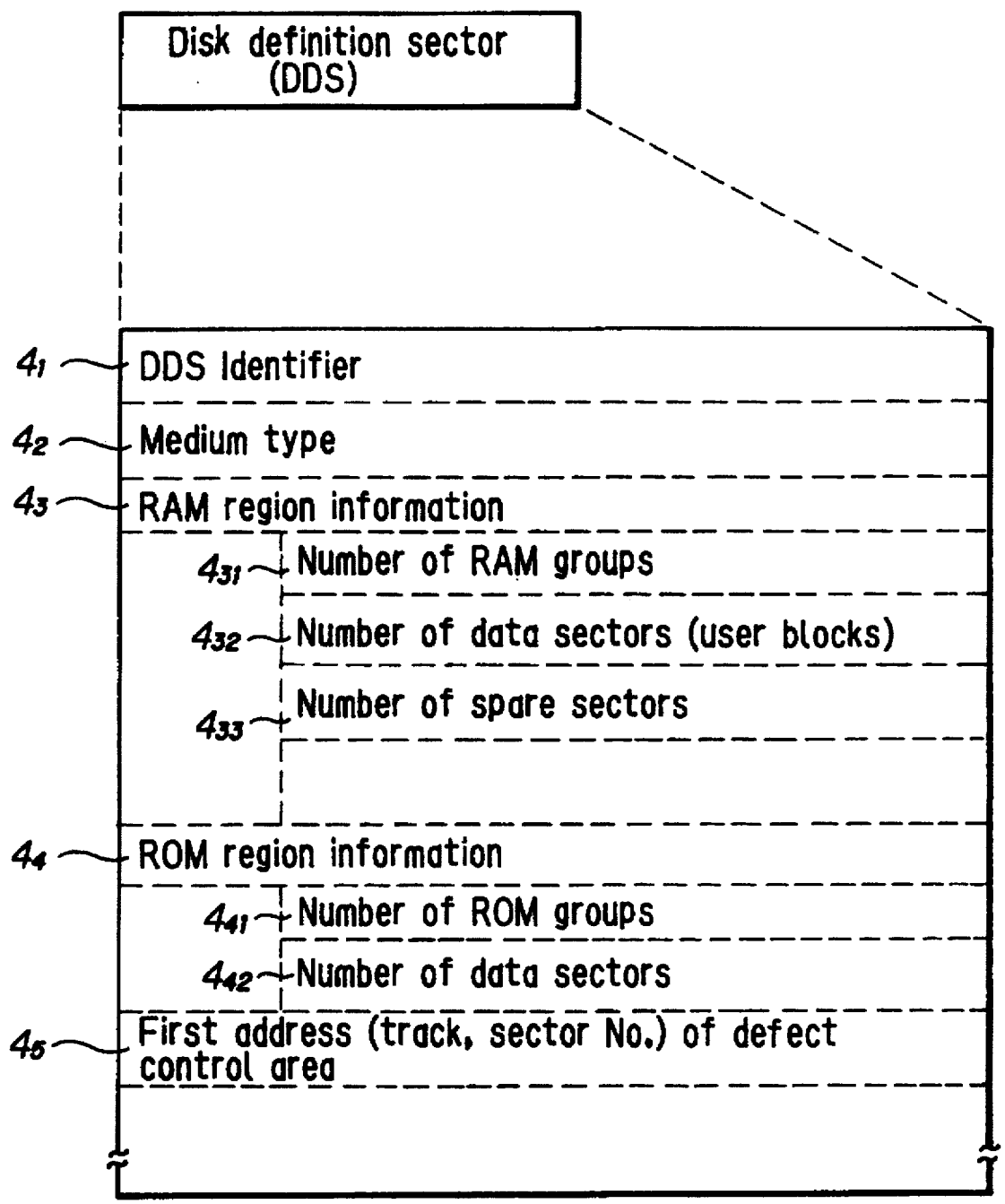
FIG. 9 is an explanatory view of a disk definition sector.
Figure 10:
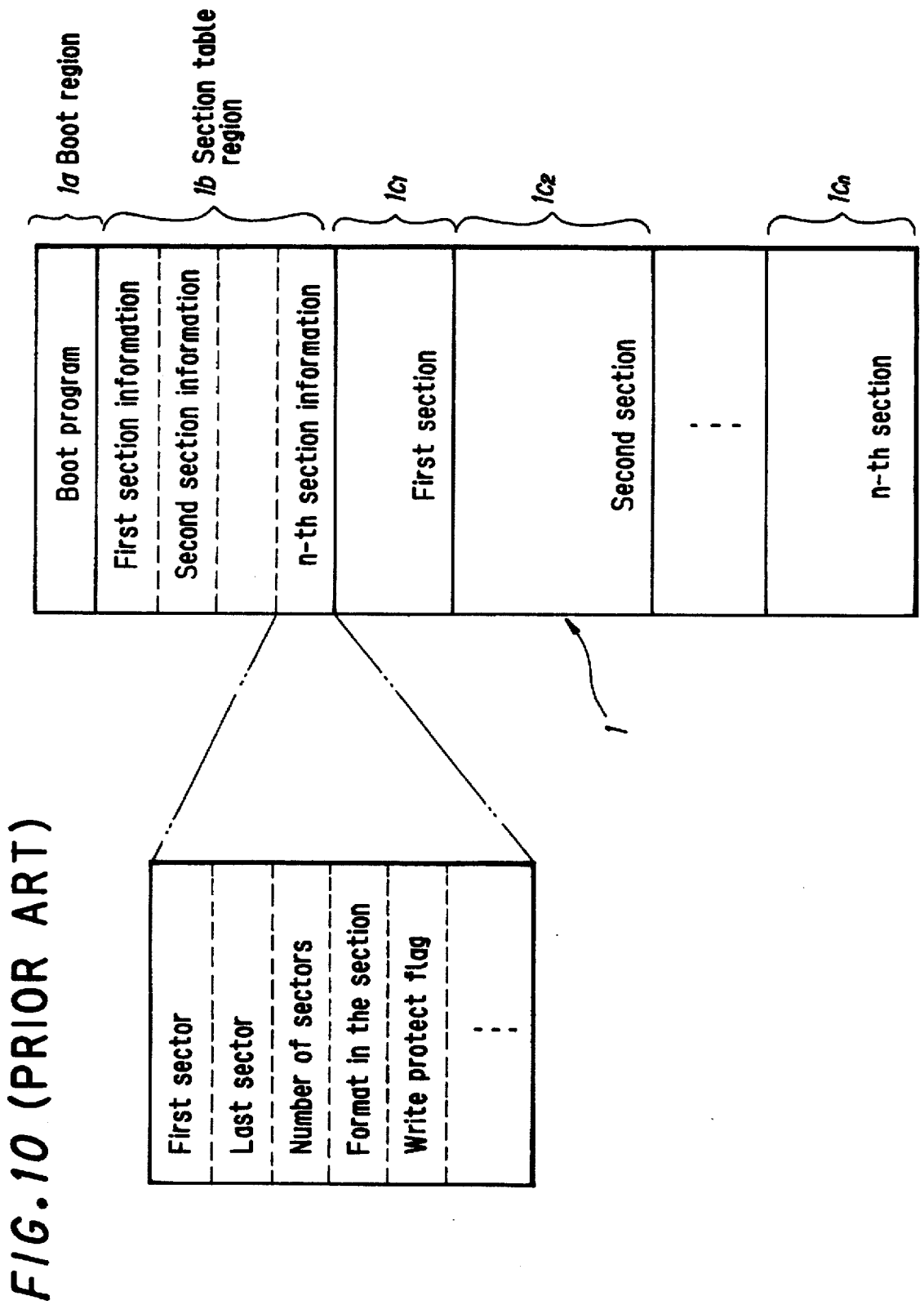
FIG. 10 shows the structure of an accessible region.

FIG. 7 is an explanatory view of an example of usage of commercially available optical disks with softwares 1, 2 containing a check program for preventing a fraudulent copy respectively written thereon. It is premised that a user is allowed to duplicate the software for the purpose of producing a backup software under a contract between the company having the copyright and the user.

The reference numeral 11 represents a commercially available optical disk of the present invention with a software (program, data) 1 containing a check program for preventing a fraudulent copy written thereon and 11' a commercially available optical disk of the present invention with a software (program, data) 2 containing a check program for preventing a fraudulent copy written thereon in the same way as in the optical disk 11. In the optical disks 11, 11', the reference numerals 12, 12' represent read-write regions (RAM regions), 13, 13' read-only regions (ROM regions), 14,14' ROM.RAM boundaries, 15,15' boundary data holding blocks, and 16, 16' blocks for storing data F which designates address of the boundary data holding blocks 15, 15', respectively.

A user purchases the optical disks 11, 11' and copies the software 2 from the optical disk 11' onto the optical disk 11 so as to produce an optical disk 11" having a backup software for the software 2. The thus-produced optical disk 11" is usually used as the backup optical disk for his personal use. When the user operates by using the optical disk 11", the host system executes the check programs contained in the softwares 1 and 2, but detects no fraudulent copy in either of the check programs. Therefore, the host system enables the execution of the softwares 1 and 2.

That is, if a fraudulent copy is checked in accordance with the present invention, it is possible to copy the softwares having different RAM sizes written on a plurality of optical disks onto on a backup optical disk for personal use. It is therefore possible to usually use only the one backup optical disk while preserving the original optical disk. In other words, it is not necessary to change mediums depending upon the software. In addition, a fraudulent copy onto a medium having a read-write region on the entire surface (RAM disk) is safely checked.

The duplication of software is restricted to the duplication of the information within the Copyright Act or under a contact between the company having the copyright and a user (including a purchaser).

Although the position of the boundary data holding block 15 is designated by the data F in this example, the data F is not necessarily required. If the address of the boundary data holding block 15 is recognized in the check program, the data F may be dispensed with.

As described above, according to the present invention, the boundary data which designates the boundary between a read-write region and a read-only region is written in a predetermined block of an optical disk, data in a block which is assumed to be in the read-only region by reference to the boundary data is read out and written into the same block, data in a block which is assumed to be in the read-write region by reference to the boundary data is read out and written into the same block, and it is judged that the optical disk is not a fraudulent copy when the data writing operation is impossible in the block which is assumed to be in the read-only region but possible in the block which is assumed to be in the read-write region and that the optical disk is a fraudulent copy when the data writing operation is possible in the block which is assumed to be in the read-only region. It is therefore possible to check a fraudulent copy not only in the case of using a RAM disk but also even if a user prepares an optical disk which has a very small ROM region and the greater part of which is a RAM region and copies the whole blocks in unit of logical block.

According to the present invention, it is also possible to copy the software written on another optical disk having an RAM region of a different size onto an optical disk of the present invention so as to operate with only one optical disk drive. Thus, the method offers convenience without raising the cost of the system.

According to the present invention, it is not necessary to change the check program even if the number of blocks in the RAM region is changed with the upgrade of a software. In addition, since the data read out of an optical disk medium as an object of fraudulent use check is written onto the same medium, the data on the optical disk medium is not destroyed.

It is also possible to judge whether or not an optical disk medium as an object of fraudulent use check is write-protected. In addition, it is possible to warn the user against the write protection so as to continue the check of a fraudulent use or execute other necessary processings.

Furthermore, according to the present invention, since the data F for designating the address of the boundary data holding block is written into at least one block on the optical disk and the block is searched for by reference to the data F, the process for obtaining the boundary data E becomes complicated, thereby preventing a fraudulent copy more effectively.

Since the data F is written in the entry of each logical section on the optical disk medium, it is possible to use the optical disk medium in various groups of logical sections.

According to the present invention, since the data E for designating the boundary is written in a block in the read-only region, it is possible to record the data E on the optical disk by stamping it together with the other data in the ROM region, thereby obviating the step of writing the data E at the time of shipping, reducing the number of steps for the production of the optical disk and, hence, providing the optical disk 11 at a low cost. Furthermore, it is possible to avoid a risk of the data E being destroyed by accident after shipping.

As many apparently widely different embodiments of the present invention can be made without departing from the spirit and scope thereof, it is to be understood that the invention is not limited to the specific embodiments thereof except as defined in the appended claims and equivalents therof.

What is claimed is:

1. An optical disk comprising:

a plurality of rewritable blocks defining a read-write region;

a plurality of read-only blocks defining a read-only region; and a boundary data block located in said read-only region for storing boundary data indicative of the boundary between said read-write region and said read-only region.

2. An optical disk according to claim 1, further comprising:
   an address data block for storing address data indicative of the address of said boundary data block.

3. An optical disk according to claim 2, wherein said address data block is located in said read-write region.

4. A method of preventing fraudulent use of optical disks having a plurality of rewritable blocks defining a read-write region, a plurality of read-only blocks defining a read-only region and a boundary data block for storing boundary data indicative of a boundary between said read-write region and said read-only region, comprising the steps of:
   (a) reading, from an optical disk, the boundary data from the boundary data block prior to the execution of software recorded on the optical disk;
   (b) reading data from a read-only block which is in the read-only region indicated by the boundary data, and attempting writing of the data read from the read-only block in the read-only region back into the read-only block;
   (c) reading data from a read-write block which is in the read-write region indicated by the boundary data and attempting writing of the data read from the read-write block in the read-write region back into the read-write block; and
   (d) judging that said optical disk is not a fraudulent use when the attempted data writing operation of said step (b) is impossible and the attempted data writing operation of step (c) is possible.

5. A method of preventing a fraudulent use of an optical disk according to claim 4, further comprising a step of judging that said optical disk is a fraudulent use when said attempted writing operation of the step (b) is possible.

6. A method of preventing a fraudulent use of an optical disk according to claim 4, further comprising a step of judging that said optical disk is write-protected when both of said attempted writing operations of the steps (b) and (c) are impossible.

7. A method of preventing a fraudulent use of an optical disk according to claim 6, further comprising a step of warning a user of said optical disk of the write protection when said optical disk is judged to be write-protected.

8. A method of preventing a fraudulent use of an optical disk according to claim 4, further comprising the steps of:
   writing data indicative the address of the boundary data block into a predetermined block of said optical disk; and
   recognizing the boundary data block by said data indicative of the address of the boundary data block.

9. A method of preventing a fraudulent use of an optical disk according to claim 4, wherein the boundary data block is provided in said read-only region.

10. An optical disk comprising:
   a plurality of rewritable blocks defining a read-write region;
   a plurality of read-only blocks defining a read-only region;
   a boundary data block located in said read-only region for storing boundary data indicative of a boundary between said read-write region and said read-only region; and
   an address data block for storing address data indicative the address of said boundary data block,
   wherein the address data is a number N when the boundary data block is N blocks distant from the last block of an accessible region of the optical disk.

11. A method for use with an optical disk having a plurality of rewritable blocks defining a read-write region and a plurality of read-only blocks defining a read-only region, a boundary data block for storing boundary data indicative of a boundary between said read-write region and said read-only region; and
   check program blocks for storing a check program; the method comprising the steps of:
   (a-1) reading the check program from the check program blocks; and in accordance with the check program,
   (a-2) reading the boundary data from the boundary data block prior to execution of software recorded on the optical disk;
   (b) reading data from a read-only block which is in the read-only region indicated by the boundary data, and attempting writing of the data read from the read-only block in the read-only region back into the read-only block;
   (c) reading data from a read-write block which is in the read-write region indicated by the boundary data and attempting writing of the data read from the read-write block in the read-write region back into the read-write block; and
   (d) judging that the optical disk is not a fraudulent use when the attempted data writing operation of said step (b) is impossible and the attempted data writing operation of said step (c) is possible.

12. A method according to claim 11 further comprising the step of, of:
   (e) allowing the said software to be executed when the optical disk is not a fraudulent use.

13. A method according to claim 12, further comprising the steps of:
   (f) judging in accordance with the check program that the optical disk is a fraudulent use when the attempted data writing operation of said step (b) is possible; and
   (g) inhibiting the software from being executed when the optical disk is a fraudulent use.

14. A method according to claim 13, further comprising:
   a step (h) of judging in accordance with the check program that said optical disk is write-protected when said attempted operation of the steps (b) and (c) are impossible both in said read-only block in the read-only region and in said read-write block in the read-write region.

15. A method for use with an optical disk having a plurality of rewritable blocks defining a read-write region, a plurality of read-only blocks defining a read-only region, and a boundary data block for storing boundary data indicative of a boundary between said read-write region and said read-only region, the method comprising the steps of:
   (a) reading, from the optical disk, the boundary data from the boundary data block prior to the execution of software recorded on the optical disk;
   (b) reading data from a read-only block which is in the read-only region indicated by the boundary data, and attempting writing of the data read from the read-only block in the read-only region back into the read-only block; and
   (c) judging that said optical disk is not a fraudulent use when the attempted data writing operation of said step (b) is impossible and that said optical disk is a fraudulent use when the attempted data writing operation of said step (b) is possible.

16. A method for use with an optical disk according to claim 15, wherein the optical disk is write unprotected.

17. An optical disk comprising;

a plurality of rewritable blocks defining a read-write region;

a plurality of read-only blocks defining a read-only region;

a boundary data block for storing boundary data indicative of a boundary between said read-write region and said read-only region; and check program blocks for storing a check program for (a) reading the boundary data from the boundary data block, (b) reading data from a read-only block which is in the read-only region indicated by the boundary data, and attempting writing of the data read from the read-only block in the read-only region back into the read-only block, and (c) judging that said optical disk is not a fraudulent use when the attempted data writing operation of (b) is impossible, and that said optical disk is a fraudulent use when the attempted data writing operation of (b) is possible.

18. An optical disk comprising;

a plurality of rewritable blocks defining a read-write region;

a plurality of read-only blocks defining a read-only region;

a boundary data block for storing boundary data indicative of a boundary between said read-write region and said read-only region; and check program blocks for storing a check program for (a) reading the boundary data from the boundary data block, (b) reading data from a read-only block which is in the read-only region indicated by the boundary data, and attempting writing of the data read from the read-only block in the read-only region back into the read-only block, (c) reading data from a read-write block which is in the read-write region indicated by the boundary data and attempting writing of the data read from the read-write block in the read-write region back into the read-write block, and (d) judging that said optical disk is not a fraudulent use when the attempted data writing operation of (b) is impossible and the attempted data writing operation of (c) is possible, and that said optical disk is a fraudulent use when the attempted data writing operation of (b) is possible.

19. A system having an optical disk drive for reading and writing data from and to an optical disk and a host apparatus for executing prescribed processing in accordance with software recorded on the optical disk, the optical disk having a plurality of rewritable blocks defining a read-write region, a plurality of read-only blocks defining a read-only region and a boundary data block for storing boundary data indicative of a boundary between said read-write region and said read-only region, said system comprising:

(a) boundary data read means for causing the optical disk drive to read the boundary data from the boundary data block;

(b) read-only data read-write means for causing the optical disk drive to read data from a read-only block which is in the read-only region indicated by the boundary data and for attempting writing of the data read from the read-only block in the read-only region back into the read-only block;

(c) read-write data read means for causing the optical disk drive to read data from read-write block which is in the read-write region indicated by the boundary data and for attempting writing of the data read from the read-write block in the read-write region back into the read-write block; and (d) judging means for judging that said optical disk is not a fraudulent use when the data writing operation attempted by said read-only data read-write means is impossible, and the data writing operation attempted by said read-write data read means is possible, and that said optical disk is a fraudulent use when the data writing operation attempted by said read-only data read-write means is possible.

20. A system having an optical disk drive for reading and writing data from and to an optical disk and a host apparatus for executing prescribed processing in accordance with software recorded on the optical disk, the optical disk having a plurality of rewritable blocks defining a read-write region, a plurality of read-only blocks defining a read-only region, a boundary data block for storing boundary data indicative of a boundary between said read-write region and said read-only region and check program blocks for storing a check program, said system comprising:

check program read means for causing the optical disk drive to read the check program from the check program blocks; and check program execution means for (a) reading the boundary data from the boundary data block;

(b) reading data from a read-only block which is in the read-only region indicated by the boundary data and attempting writing of the data read from the read-only block in the read-only region back into the read-only block;

(c) reading data from a read-write block which is in the read-write region indicated by the boundary data and attempting writing of the data read from the read-write block in the read-write region back into the read-write block; and (d) judging that said optical disk is not a fraudulent use when attempted data writing operation of (b) is impossible and the attempted data writing operation of (c) is possible, and that said optical disk is a fraudulent use when the attempted data writing operation of (b) is possible.

21. A system having an optical disk drive for reading and writing data from and to an optical disk and a host apparatus for executing prescribed processing in accordance with software recorded on the optical disk, the optical disk having a plurality of rewritable blocks defining a read-write region, a plurality of read-only blocks defining a read-only region, and a boundary data block for storing boundary data indicative of a boundary between said read-write region and said read-only region, said system comprising:

(a) boundary data read means for causing the optical disk drive to read the boundary data from the boundary data block;

(b) read-only data read-write means for causing the optical disk drive to read data from a read-only block which is in the read-only region indicated by the boundary data and attempting writing of the data read from the read-only block in the read-only region back into the read-only block;

(c) means for judging that said optical disk is not a fraudulent use when the data writing operation attempted by said read-only data read-write means is impossible, and that said optical disk is a fraudulent use when the data writing operation attempted by said read-only data read-write means is possible.

22. A method of using optical disks each having a plurality of rewritable blocks defining a read-write region, a plurality of read-only blocks defining a read-only region, a boundary data block for storing boundary data indicative of a boundary between said read-write region and said read-only region, and operating programs blocks for storing an operating program, said method comprising:

(a-1) copying an operating program from one optical disk onto another optical disk to produce an optical disk having various operating programs;

(a-2) reading, from said another optical disk, boundary data from the boundary data block prior to the execution of one of the various operating programs recorded on said optical disk;

(b) reading data from a read-only block which is in the read-only region indicated by the boundary data, and attempting writing of the data read from the read-only block in the read-only region back into the read-only block;

(c) judging that said optical disk is not a fraudulent use when the attempted data writing operation of said step (b) is impossible and that said optical disk is a fraudulent use when the attempted data writing operation of said step (b) is possible; and (d) allowing the operating program to be executed when the optical disk is not a fraudulent use and inhibiting the operating program from being executed when the optical disk is a fraudulent use.

* * * * *

UNITED STATES PATENT AND TRADEMARK OFFICE
CERTIFICATE OF CORRECTION

PATENT NO. : 5,684,785            Page 1 of 4
DATED : November 4, 1997
INVENTOR(S) : Itami et al.

It is certified that error appears in the above-identified patent and that said Letters Patent is hereby corrected as shown below:

Column 1, line 61, after "region" insert --,--

Column 1, line 62, delete "field" and insert --fields-- therefor

Column 2, line 48, delete "These R0M" and insert --These ROM-- therefor

Column 2, line 48, delete "partial R0M" and insert --partial ROM-- therefor

Column 2, line 63, after "does" insert --not--

UNITED STATES PATENT AND TRADEMARK OFFICE
CERTIFICATE OF CORRECTION

PATENT NO. : 5,684,785
DATED : November 4, 1997    Page 2 of 4
INVENTOR(S) : Itami et al.

It is certified that error appears in the above-identified patent and that said Letters Patent is hereby corrected as shown below:

Column 3, line 18, delete "block, units" and insert --block units,-- therefor

Column 4, line 14, delete "has an" and insert

--has a-- therefor

Column 4, line 42, after "indicative" insert

--of a--

Column 5, line 67, delete "an RAM" and insert --a RAM-- therefor

Column 8, line 48, delete "are" and insert

--is-- therefor

UNITED STATES PATENT AND TRADEMARK OFFICE
CERTIFICATE OF CORRECTION

PATENT NO. : 5,684,785  Page 3 of 4
DATED : November 4, 1997
INVENTOR(S) : Itami et al.

It is certified that error appears in the above-identified patent and that said Letters Patent is hereby corrected as shown below:

Column 9, line 54, delete "contact" and insert --contract-- therefor

Column 10, line 15, delete "having an" and insert --having a -- therefor

Column 11, line 46, after "data indicative"

insert --of--

UNITED STATES PATENT AND TRADEMARK OFFICE
CERTIFICATE OF CORRECTION

PATENT NO. : 5,684,785
DATED : November 4, 1997
INVENTOR(S) : Itami, et. al.

It is certified that error appears in the above-identified patent and that said Letters Patent is hereby corrected as shown below:

Column 12, line 31, after "step of", delete -- of--

Signed and Sealed this

Twentieth Day of October, 1998

Attest:

BRUCE LEHMAN

Attesting Officer

Commissioner of Patents and Trademarks